United States Patent
Mokros

[11] 3,777,460
[45] Dec. 11, 1973

[54] LAWN CONDITIONING MACHINE
[76] Inventor: Frank Mokros, 223 New York Ave., North Bay Shore, N.Y.
[22] Filed: Dec. 17, 1969
[21] Appl. No.: 886,050

Related U.S. Application Data
[62] Division of Ser. No. 642,884, June 1, 1967, abandoned.

[52] U.S. Cl. ................................. 56/16.7, 172/42
[51] Int. Cl. .......................................... A01d 51/00
[58] Field of Search .................. 56/27, 330; 172/21, 172/42

[56] References Cited
UNITED STATES PATENTS
3,406,761  10/1968  Ryan .............................. 56/330 X
3,417,554  12/1068  Sudhoff ................................. 56/27
3,438,183   4/1969  Puretio ................................. 56/27

Primary Examiner—Russell R. Kinsey
Attorney—Arthur T. Groeninger

[57] ABSTRACT

A lawn conditioning machine comprising grass raking tines. The raking action is a natural reciprocal movement during which foreign material is made free and gathered. The rake is angularly and height adjustable to vary the depth of raking action. The tines are removably supported so as to allow individual replacement in case of damage. A detachable lawn conditioning device is provided for performing other lawn conditioning functions.

12 Claims, 10 Drawing Figures

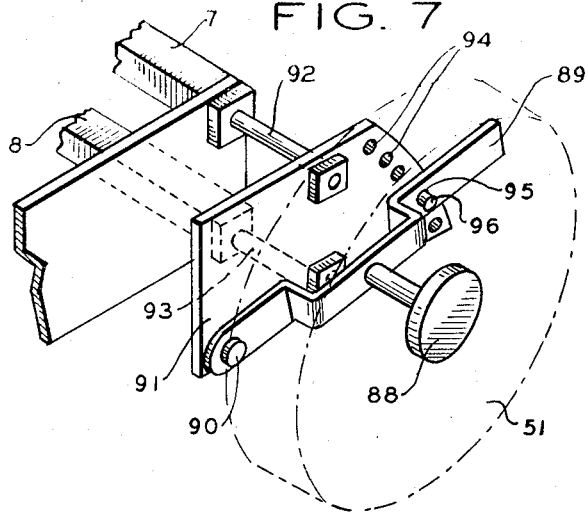
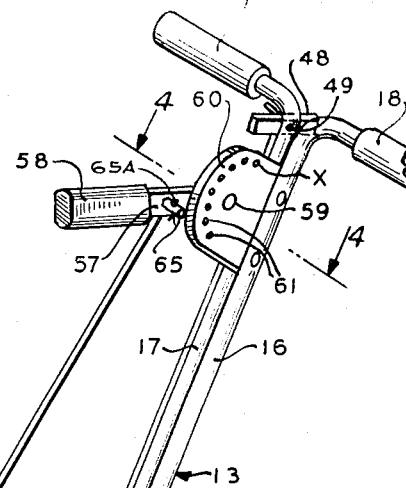
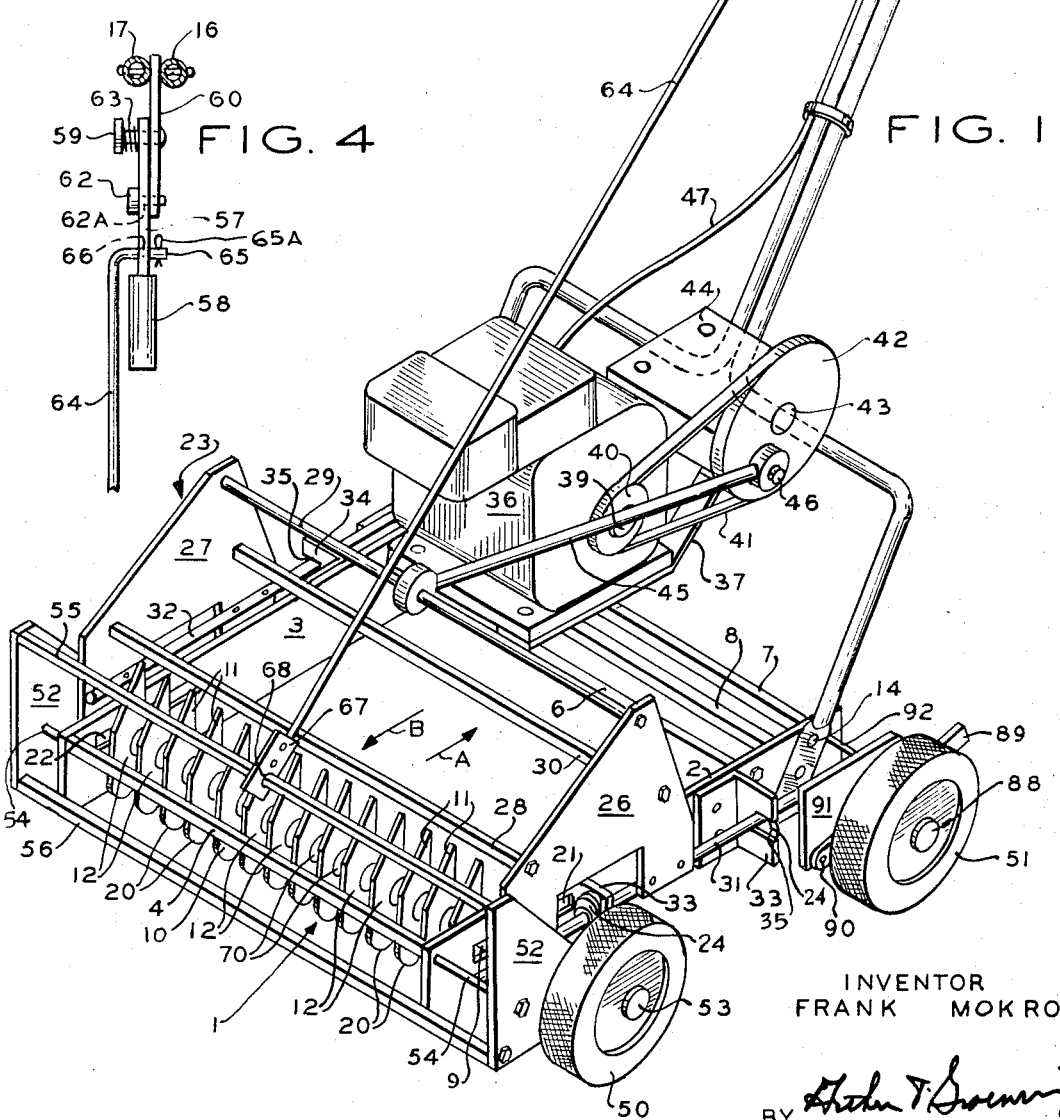
INVENTOR
FRANK MOKROS

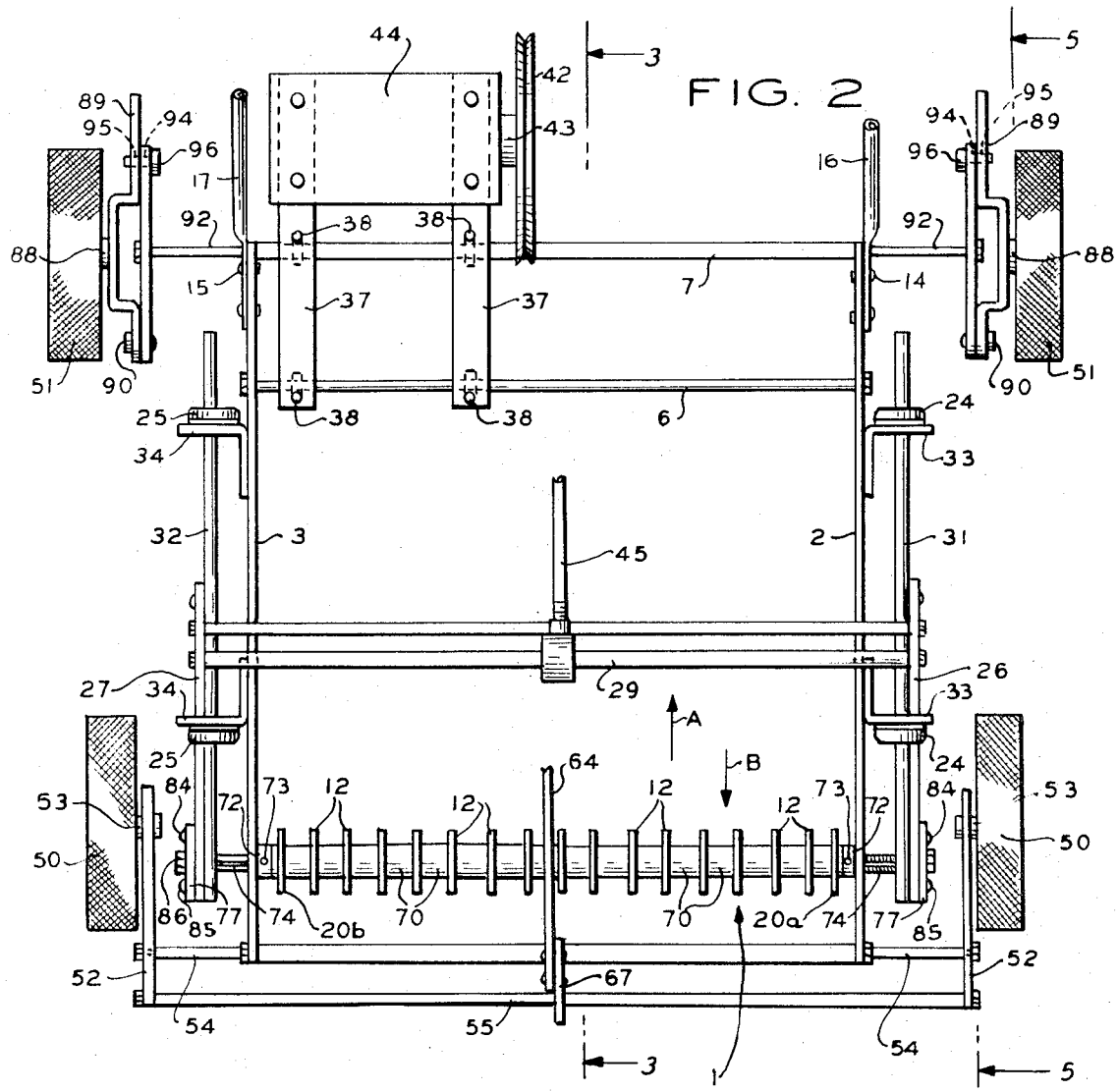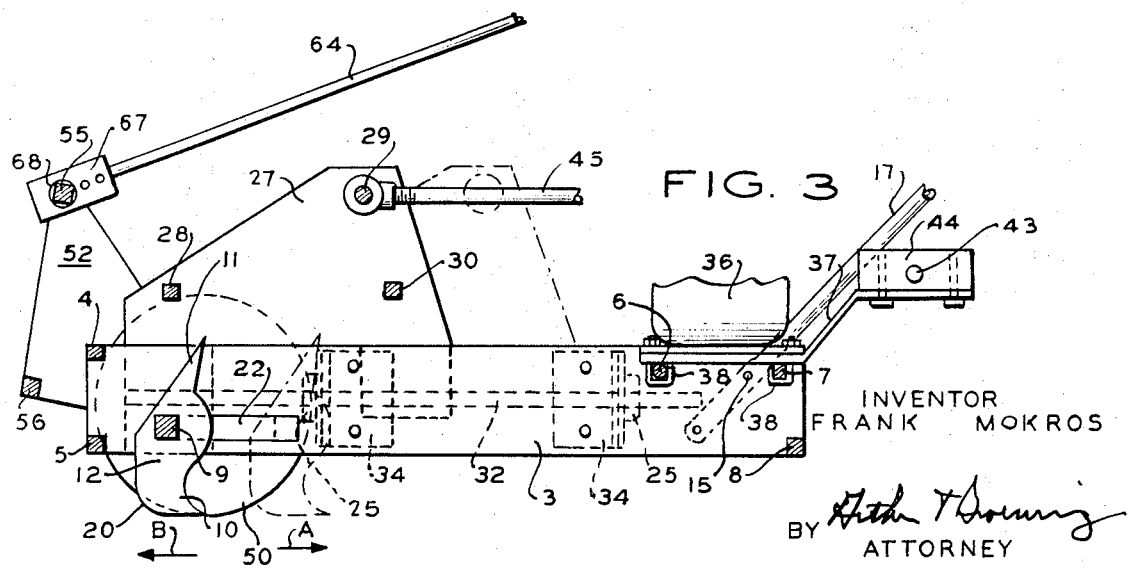

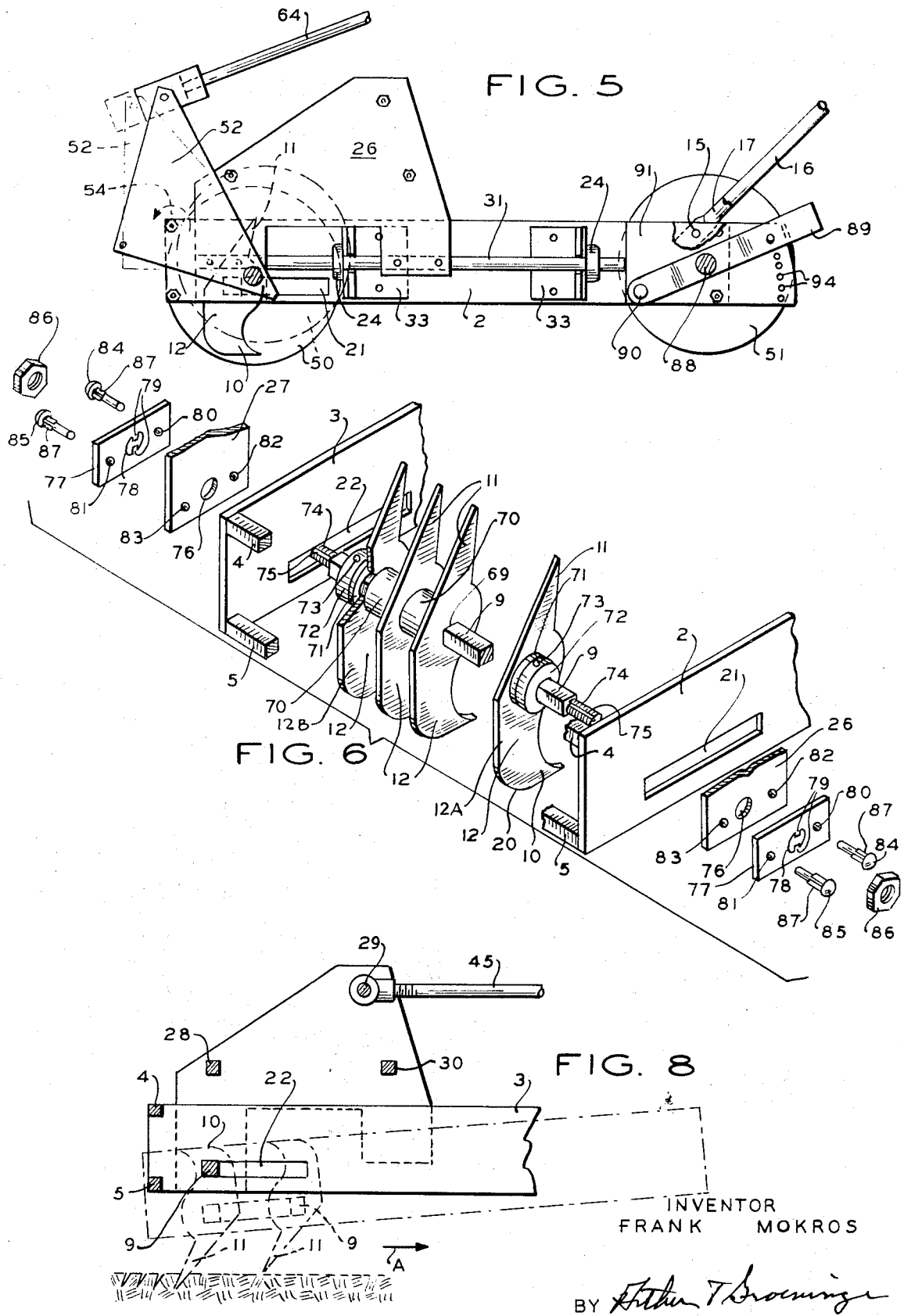

LAWN CONDITIONING MACHINE

This application is a division of copending application Ser. No. 642,884, now abandoned, filed June 1, 1967 in the name of Frank Mokros.

BACKGROUND OF THE INVENTION

There are two main problems in lawn conditioning.

Firstly, the presence of dead grass and clippings and prostrate living stems interfere with the growth of new grass or may smother it completely. Various and diverse types of rotary power driven rakes which dislodge such old dead material are well known in the art. Examples of such rakes are shown and described in U.S. Pat. No. 2,902,098, U.S. Pat. No. 2,987,866, U.S. Pat. No. 3,024,587, U.S. Pat. No. 3,125,844, U.S. Pat. No. 3,217,474, and U.S. Pat. No. 3,211,483. These prior art rakes, however, are all rotary devices and have not proved to be satisfactory.

Secondly, lawns, where the turf is subjected to packing action or where turf hardens in areas where there is relatively little moisture from rainfall during extended portions of the year, are much in need of perforation to open the soil around the grass roots for the reception of air, water, fertilizer, top dressing and other agents for the stimulation of grass growth. Various power driven devices have been produced for perforating soil such as those shown and described in U.S. Pat. Nos. 2302944, U.S. Pat. No. 2303726, U.S. Pat. No. 2347748, U.S. Pat. No. 3163235 and U.S. Pat. No. 3204703. All of these prior art devices are deficient in that they are not able to be adjusted to meet the particular requirements of the ground being perforated.

SUMMARY OF THE INVENTION

Briefly, the present invention is comprised of a wheel supported frame member which supports a rake-aerator bar for reciprocating movement. The rake-aerator bar has arcuate raking tines depending therefrom in one direction and perforating spikes depending therefrom in a substantially diametrically opposed direction. The rake-aerator bar is adjustably mounted so as to selectively position either the raking tines or aerating spikes in an operative position.

The front wheels and rear wheels of the device are adjustably connected to the frame so as to vary the depth and angle at which the raking tines and aerating spikes operate.

When raking, wheel adjustment is made so that the raking tines reciprocate in a path adjacent to the ground. When aerating, wheel adjustment is made so that the perforating spikes are angularly disposed to minimize tear and to meet the particular requirements of the lawn under treatment.

The raking tines have an arcuate intermediate portion and a pointed end portion. The arcuate intermediate portion is the leading portion of the rake in one direction of movement and the pointed end portion is the leading portion in the other direction of movement thereby enabling the rake to simultaneously rake and gather.

An attachment is adapted to be detachably connected to the rake-aerator bar for performing an additional lawn care function. The rake aerator bar is raised to an above ground non-operational position where the attachment is employed. Upon operation, only the attachment is in position to function.

DRAWINGS

FIG. 1 is a perspective view of the present invention.

FIG. 2 is a top plan view of the present invention, some parts being broken away.

FIG. 3 is a sectional view taken on line 3—3 of FIG. 2 illustrating the operation of the raking tines.

FIG. 4 is a sectional view taken on line 4—4 of FIG. 1 and illustrating, more particularly, the manually operated height control member.

FIG. 5 is a sectional view taken on line 5—5 of FIG. 3.

FIG. 6 is an exploded view of the rake aerator bar.

FIG. 7 is a fragmentary perspective view of the adjustable connection between the rear wheel and the frame of the device.

FIG. 8 is a fragmentary diagramatic view illustrating the operation of the perforating spikes.

DETAILED DESCRIPTION

Figure 9:
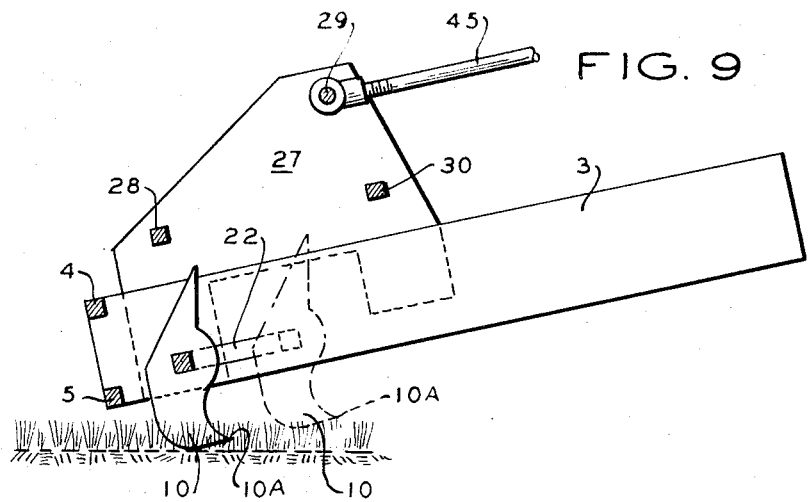
FIG. 9 is a fragmentary diagramatic view illustrating angular adjustment of the raking tines.

Referring to FIGS. 1, 2 and 3, the invention comprises a wheel supported frame member which supports a rake-aerator bar 1 for reciprocating movement. The frame member comprises parallel side frame members 2 and 3 which are rigidly interconnected at the front by rods 4 and 5 and are interconnected at the rear by rods 6, 7 and 8. The rake-aerator bar 1 includes a supporting shaft 9, having raking tines 10 extending therefrom in one direction and perforating spikes 11 extending therefrom in a substantially diametrically opposite direction. The individual oppositely disposed tines 10 and spikes 11 are integrally joined and formed from the same sheet of material 12.

Referring to FIGS. 1 and 2, a handle 13 is bolted to the frame side member 2 and 3 at 14 and 15, respectively. Handle 13 includes a pair of handle bars 16 and 17 which extend upwardly and rearwardly from the rear frame structure. The handle bars 16 and 17 are provided at their extreme ends with hand grips 18 and 19. The device is adapted to be unidirectionally manually propelled (or power operated as hereinafter explained) in the direction indicated by arrow A in FIG. 1 so that the operator walks in advance of machine travel. If preferred, handle 13 could extend forwardly of the machine so that the operator would walk in a trailing path to machine travel, or in the alternative, the handle 13 could be pivotally mounted by conventional means to the frame side members 2 and 3 so as to leave the method of handling to the whim of the operator.

As shown in FIGS. 1 and 3, the raking tines 10 are in the operative position and are adapted to be reciprocated in a path adjacent and substantially parallel to the ground. Referring particularly to FIG. 3, on the rearward stroke (indicated by arrow A), raking tines 10 function to loose and gather foreign material between healthy growths of grass. On the forward stroke, (indicated by arrow B) arcuate intermediate portions 20 of raking tine 10 is the leading portion. Due to the arcuate design of intermediate portion 20, the raking tines 10 are prevented from returning loose material gathered on the rearward stroke. As hereinbefore described, the device is adapted to be unidirectionally propelled by handle 13 in the direction of arrow A and as a result, foreign material will be gathered as the machine moves along.

The side frame members 2 and 3 support the rake-aerator bar 1 for reciprocating movement. Referring to FIGS. 1, 2 and 3, the ends of support shaft 9 of rake-aerator bar 1 extend through slots 21 and 22 in parallel side frame members 2 and 3 respectively and are connected to a support assembly 23 which is mounted for reciprocating movement by pairs of tubular sleeves or slide bearing members 24 and 25 on side frame members 2 and 3 respectively. The ends of support shaft 9 are connected to support plates 26 and 27 of support assembly 23, by means hereinafter described. Support plates 26 and 27 are rigidly interconnected by rods 28, 29 and 30 and are bolted to and supported by shafts 31 and 32 respectively. Shafts 31 and 32 extend through pairs of slide bearing members 24 and 25, respectively, and are adapted to reciprocally slide freely therethrough. Pairs of bearing members 24 and 25 are mounted on pairs of L shaped brackets 33 and 34, respectively, which are bolted to side frame members 2 and 3. Each of the L shaped brackets 33 and 34 have U shaped cut out portions 35 to allow passage of shafts 31 and 32 therethrough.

A motor 36 comprising an internal combustion engine is provided to reciprocate the aerator rake support assembly 23. Motor 36 is mounted on parallel plates 37 which are bolted by J shaped bolts 38 to rods 6 and 7 of the frame. While an internal combustion engine is illustrated, any type of motor or power plant can be employed.

In order to reciprocate the aerator support assembly 23, a suitable transmission is provided as shown in FIG. 1. Motor 36 has a drive shaft 39 which has keyed or otherwise secured thereto a pully wheel 40. Trained about the pulley wheel 40 is a V belt or the like 41 and this belt is in turn trained about a large pulley wheel 42 keyed or otherwise secured to a shaft 43. If desired, any conventional transmission arrangement can be used in place of pulleys and belt such as e.g. a sprocket and chain arrangement. Shaft 43 is supported for rotation in bearing block 44 which is mounted on and supported by parallel support plates 37 (see FIG. 3). A reciprocating shaft 45 is pivotally connected to pulley wheel 42 at an off center position at 46 so as to translate the rotary motion of the pulley 42 to reciprocal motion. The opposite end of the shaft 45 is pivotally connected to rod 29 of the aerator rake support assembly 23. The speed of the internal combustion engine or motor 36 may be controlled by any conventional means such as, e.g. a flexible cable 47 to an operating lever 48 mounted on a pivot 49.

As hereinbefore described, the machine is adapted to be manually propelled along a ground surface. Optionally, the machine may be propelled by motor 36 by means of conventional drive means between the motor 36 and either the front or rear wheels.

HEIGHT ADJUSTMENT OF RAKE-AERATOR BAR

The aerator-rake bar 1 is adjustably mounted to vary the depth at which the raking tines 10 and perforating spikes 11 operate so as to meet the particular requirements of a selected lawn. With a good lawn, the depth of raking and perforating can be kept to a minimum thereby minimizing damage to good growths of grass. With a poor lawn the opposite holds true. The rake-aerator bar 1 can be raised above operating level so as to reduce the load when starting the motor 36.

Referring to FIGS. 1 and 2, the frame member supporting the rake-aerator bar 1 is supported by pairs of front and rear wheels 50 and 51, respectively. The front wheels 50 are pivotally connected to the frame member for swinging movement so as to permit height adjustment of the rake-aerator bar 1 relative to the ground. For this purpose, the front wheels 50 are rotatably mounted on brackets 52 by stub shafts 53. Brackets 52 are pivotally connected to the side frame members 2 and 3 by pivot pins 54 which are integral with and extend axially of front frame rod 4. Brackets 52 are interconnected by parallel rods 55 and 56 so that both front wheels 50 are adjusted to the same extent.

Referring to FIGS. 1 and 4, a manually operated lever bar 57 having a hand grip 58 is provided for adjusting the height of the rake-aerator bar 1. The lever bar 57 is pivotally connected by a pivot pin 59 to a support plate 60 which in turn is bolted to the handle 13. The support plate 60 contains apertures 61 which are adapted to receive a locking pin 62 which also extends through an aperture 62A in lever bar 57 so as to lock the lever bar 57 in a selected position. The lever bar 57 is under tension provided by a spring 63 which extends between the head of pivot pin 59 and the surface of the lever bar 57.

The lever bar 57 is operatively connected by a rod 64 to rod 55 of the front wheel support assembly. Rod 64 has a terminal portion 65 which forms a pivot pin and extends through an aperture 66 in lever bar 57. A cotter pin 65A prevents lateral displacement of terminal portion 65. The opposite end of rod 64 is bolted to plate 67 which is apertured at 68 to receive rod 55 of the front wheel support assembly.

In operation, the lever bar 57 is initially moved and locked into an aperture 61 designated as X in FIG. 1. Movement of the lever bar 57 to position X will move the rod 64 and in turn, pivot the front wheel support assembly, so that the wheel support brackets 52 assume the position shown in solid lines in FIG. 5. In this position, the wheel support brackets have swung the front wheels 50 downwardly sufficiently so that the aerator-rake bar 1 is placed in an above ground level and engine load is reduced for ease in starting. After the engine is started, the lever bar 57 is moved forwardly to any of the other apertures 61 and the aerator-rake bar 1 assumes an operative position, i.e. at or below tire level as shown e.g., in broken lines in FIG. 5. The depth to which the aerator-rake bar 1 operates can be varied by moving the lever bar 57 to a selected one of the other apertures 61 as conditions of a particular lawn require.

RAKE-AERATOR BAR

A most important feature of the present invention is its capability of converting from a raking device to a perforating device. The rake-aerator bar 1 has, as hereinbefore described, raking tines 10 extending therefrom in one direction and perforating spikes 11 extending therefrom in a substantially diametrically opposite direction. The tines 10 and spikes 11 are integrally joined and formed from the same sheet of material 12, hereinafter generically referred to as diverse conditioning element 12. A still further feature of the present invention is that diverse conditioning elements 12 are individually removably mounted.

Referring to FIG. 6, diverse conditioning elements 12 forming the raking tines 10 and aerating spikes 11 are removably mounted on support shaft 9 so that in case of damage there is a need only for replacing one diverse conditioning element 12 and not the entire bar 1. For this purpose, diverse conditioning element 12 has a rectangular aperture 69 which is adapted to slide over support shaft 9. Shaft 9 has a rectangular cross section so that each of the diverse conditioning elements 12 are locked against pivotal movement. Spacing collars 70 are also mounted on support shaft 9 and disposed between adjacent diverse conditioning elements 12.

Washers 71 and locking collars 72 are also mounted on support shaft 9 adjacent the outer surfaces of end diverse conditioning elements 12A and 12B. Set screws 73 extend through collars 72 so as to lock the collars in place and in turn to prevent lateral movement of the diverse conditioning elements 12. In case of damage to a conditioning element 12, the collar 72 nearest the damaged element 12 is removed and the conditioning elements 12 together with the spacing collars 72 are removed by sliding the same off support shaft 9. The damaged element 12 is replaced by a new element, and the rake-aerator bar 1 is reassembled.

The perforating spikes 11 may be placed in an operative position by a simple adjustment. Referring to FIG. 6, the ends of support shaft 9 extend freely through slots 21 and 22 in side frame members 2 and 3. Shaft 9 has threaded end portions 74 integrally connected therewith and axially extending therefrom. End portions 74 have diametrically opposite grooved portions 75. Threaded portions 74 extend through apertures 76 in support plates 26 and 27 of support assembly 23. A locking plate 77 having an aperture 78 with diametrically opposed projections 79 keys to the grooved threaded portion 74. The locking plate 77 has apertures 80 and 81 and the support plates 26 and 27 have aligned apertures 82 and 83 adapted to receive locking pins 84 and 85 for locking the plate 77 and in turn, the support shaft 9 of the aerator-rake bar 1 against rotation. Finally, bolts 86 are threaded to end portion 74 so as to prevent axial movement of the shaft.

If it is desired to place the aerating tines in an operative position, bolt 86 together with locking plate 77 is removed. Removal of plate 77 carries with it locking pins 84 and 85 which are frictionally locked to the plate 77 by protuberances 87. Support shaft 9 is rotated through 180° thereby placing the perforating spikes 11 in an operative position. The locking plates 77 and bolts 86 are again placed in position and the perforating spikes 11 are ready for operation.

ANGULAR ADJUSTMENT OF RAKE-AERATOR BAR

The frame supporting the aerator-rake bar 1 is selectively adjustable so that the perforating spikes 11 may be tilted toward ground for operation thereof. This provides two important features of the present invention. Firstly, the angle of perforation can be adjusted to meet the particular requirements of a lawn under treatment. Secondly, the angle at which the rake is disposed can be varied so as to provide an additional means for adjusting the height of the rake tines 10 relative to the ground.

The frame for rake-aerator bar 1 is, as hereinbefore described, supported by rear wheels 51. The rear wheels 51 are pivotally connected to the frane member so that the frame, and in turn, the perforating spikes 11 may be tilted toward the ground for penetration thereof upon reciprocation of the rake-aerator bar 1.

Referring to FIG. 2, and 7, the rear wheels 51 are mounted on stub shafts 88 extending from lever arms 89. Lever arms 89 are pivotally connected by a pivot pin 90 to a support plate 91. Support plate 91 is fixedly connected to support pins 92 and 93 integral with and extending axially of rear frame rods 7 and 8, respectively. Apertures 94 are provided in support plate 91 which are adapted to be selectively aligned with an aperture 95 in lever arm 89. A locking pin 96 is adapted to be extended through aperture 95 and a selected aperture 94 so as to position the rear wheels in an adjusted position. By swinging the lever arm 89 downwardly, the rear of the support frame is raised as shown in broken lines in FIG. 8. It is to be understood that plate 91 may be made larger and additional apertures 94 provided so that the rear of the frame can be raised to a greater degree.

Referring to FIG. 8, the perforating spikes 11 are periodically propelled into the ground when support frame is tilted as shown in broken lines in FIG. 8. The operator moves the machine rearwardly (in the direction of the arrow A). The spikes 11 are inclined forwardly so as to minimize any tearing of the surface of the ground as the operator moves the machine. If a good lawn is being perforated, the rear of the frame is only slightly raised so as to effectively eliminate tearing and to keep perforation to a minimum depth. As hereinbefore described, the depth of perforation can be further controlled by adjustment of the front wheels 50.

Referring to FIG. 9, the frame is shown in an angularly adjusted position as in FIG. 8, except that now the raking tines 10 are placed in operative position. It will be noted that the pointed end 10A of the tines are now in a raised position relative to the ground. If the rake is operating under these conditions, only the top surface will be raked. This is desirable when a lawn in good condition is being raked as it minimizes the danger of raking out good growths. While a similar action would take place by merely adjusting the height of the rake-aerator bar 1, it is pointed out that the need for a separate height control mechanism, while desirable, is not essential to the present invention. In addition, height adjustment in this manner assists in the gathering function as the portion of tine adjacent pointed end 10A bears against the ground and tends to assist in gathering loose material which falls below the pointed end level.

ATTACHMENT

The present invention is further capable of performing additional lawn care functions by conditioning elements of the type which are normally moved adjacent the ground such as e.g. hoes, plows, etc.

Figure 10:
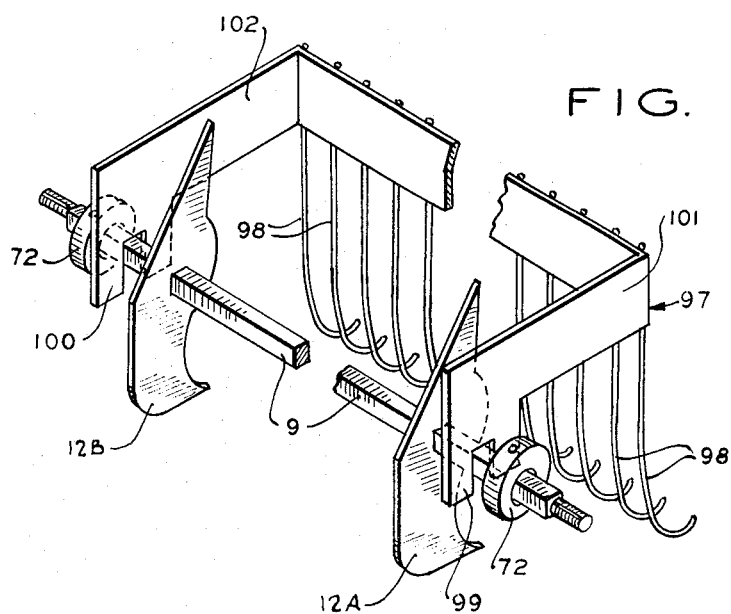
FIG. 10 is an exploded view of the rake-aerator bar having an auxiliary lawn conditioning device detachably connected thereto.

Referring to FIG. 10, an attachment comprising a bamboo rake 97 having downwardly depending tines 98 is provided. It is to be understood that rake 97 is shown merely as one example of conditioning elements of the type which are moved adjacent the ground. The bamboo rake 97 is adapted to be attached by yoke member 99 and 100 which depend from support arms 101 and 102. Yoke members 99 and 100 slide over support shaft 9 of the aerator-rake bar 1 and are locked in place between the end conditioning elements 12A and B and locking collars 72.

The rake-aerator bar 1 is raised to an above operational level before the rake 97 is attached. The rake 97 is attached and the tines 98 are of such length as to flexibly bear against the ground. In operation, the rake 97 merely performs a gathering function thereby completely eliminating any danger of tearing into the lawn.

SUMMARY OF OPERATION

Referring to FIG. 1, the raking tines 10 are in an operative position. The manually operated lever bar 57 is moved to position X. Motor 36 is started. Lever bar 57 is moved forwardly and locked to an aperture 61 selected in accordance with the desired raking depth. Movement of lever bar 57 pivots front wheel support plates 52 and 53 about pin 54 so as to swing the front wheels upwardly relative to side frame member 2 and 3 (see broken lines in FIG. 5). As a result, the raking tines 10 are lowered into ground contact. The raking tines 10 reciprocates in a path adjacent to the ground as shown in FIG. 3 and the machine is moved in the direction indicated by arrow A. As a result, foreign material is made loose and gathered.

Referring to FIG. 6, and 8, if it is desired to aerate, the rake aerator-bar 1 is adjusted so as to place the perforating spikes 11 in an operative position. Firstly, nut 86 and locking plate 77 are removed. The support shaft 9 of the rake-aerator bar 1 may then be rotated through 180° thereby placing the perforating spikes 11 in an operative position. Locking plate 77 and nut 86 are again attached thereby locking the perforating tines 11 in position.

Referring to FIG. 7, the rear of the side frame member 2 and 3 are then raised by swinging lever arm 89 downwardly and locking it in a selected aperture 94. The side frame members assume a tilted position shown in FIG. 8. Motor 36 is started and the perforating spikes 11 are periodically propelled into the ground. If desired, the depth of perforating can be adjusted by manually operated lever bar 57.

Referring to FIG. 9, the raking tines 10 are shown in an operative position. The pointed end 10A of the tines 10 are in a raised position relative to the ground as a result of raising of the rear of the frame. In this position only the top layer of the lawn will be raked.

Referring to FIG. 10, an additional lawn conditioning member, such as that shown at 97, can be attached to the rake-aerator bar 1 if desired. In operation, member 97 reciprocates in a path adjacent the ground to perform its function in the same manner as raking tines 10. When in operation, the raking tines 10 are above ground and do not interfere in any way with the operation of member 97.

The foregoing description and accompanying drawings clearly illustrate pereferred embodiments of this invention but it will be understood that changes may be made within the scope of the following claims.

I claim:

1. A device comprising a frame, raking means, power means, connecting means for connecting said power means to said raking means to move said raking means in a path adjacent and substantially parallel to the ground, first and second means laterally spaced on said frame for slidably supporting said connecting means.

2. A device as defined by claim 1, said frame including first and second spaced members, said first means including a first bearing member mounted on said first member, said second means including a second bearing member mounted on said second member.

3. A device as defined by claim 2, a first shaft slidably mounted in said first bearing member and a second shaft slidably mounted in said second bearing member; said first and second shafts being connected to said raking means.

4. A device as defined by claim 1, means for adjustably mounting said frame means
    for adjusting the angle of said raking means relative to ground.

5. A device as defined by claim 4, including means for adjusting the height of said raking means relative to ground.

6. A device as defined by claim 1, means for adjusting the angle of said raking means so that an intermediate portion of said raking means can be placed at a lower depth then the end portion of said raking means.

7. A device comprising raking means, said raking means including a shaft, tines, means for removably mounting raking tines on said shaft, first and second support members, means for removably connecting said support members to said shaft proximate the ends thereof, first and second means for mounting said support members for reciprocal movement, power means, means interconnecting said first and second members, means connecting said last mentioned means to said power means.

8. A device as defined by claim 7, means for adjusting the angle of said raking means relative to ground.

9. A device as defined by claim 8, including means for adjusting the height of said raking means relative to ground.

10. A device as defined by claim 7, means for adjusting the angle of said raking means so that an intermediate portion of said raking means can be placed at a lower depth then the end portion of said raking means.

11. A power rake adapted to be steered by a walking attendant comprising:
    a ground supported mobile frame having a handle and four wheels;
    a traverse rake member having downwardly directed teeth and a supporting structure movably supported on said frame for longitudinal motion relative to said frame;
    a power source on said frame:
    and mechanically means interconnecting said power source and the supporting structure of said rake to reciprocate the support structure and rake longitudinally relative to said frame.

12. A power rake as set out in claim 11 wherein said power source comprises:
    a motor having an output member;
    a transverse shaft rotably mounted on said frame;
    drive means operatively connected between said motor output member and said shaft;
    a radial crank arm fixed to said shaft;
    and a rigid link pivotally connected about parallel transverse axes at its ends to said crank arm and rake supporting structure stem respectively.

* * * * *